United States Patent
Sharma et al.

(10) Patent No.: US 11,272,382 B2
(45) Date of Patent: Mar. 8, 2022

(54) INTERFERENCE REDUCTION FOR WIRELESS COMMUNICATIONS DEVICES

(71) Applicant: Cypress Semiconductor Corporation, San Jose, CA (US)

(72) Inventors: Ankit Sharma, Faridabad (IN); Ayush Sood, Bangalore (IN); Suprojit Mukherjee, Kalyani (IN); Ashok Nimmala, Telangana (IN); Rajendra Kumar Gundu Rao, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/831,403

(22) Filed: Mar. 26, 2020

(65) Prior Publication Data

US 2021/0306872 A1 Sep. 30, 2021

(51) Int. Cl.
  *H04W 24/02* (2009.01)
  *H04B 1/10* (2006.01)
  *H04W 4/80* (2018.01)
  *H04W 84/12* (2009.01)

(52) U.S. Cl.
  CPC .............. *H04W 24/02* (2013.01); *H04B 1/10* (2013.01); *H04W 4/80* (2018.02); *H04W 84/12* (2013.01)

(58) Field of Classification Search
  CPC ....... H04W 24/02; H04W 4/80; H04W 84/12; H04B 1/10
  See application file for complete search history.

(56) References Cited

U.S. PATENT DOCUMENTS

| | | | | |
|---|---|---|---|---|
| 8,379,778 | B2* | 2/2013 | Yan | H04L 25/03006 375/346 |
| 8,488,724 | B2* | 7/2013 | Daneshrad | H04B 1/10 375/346 |
| 8,755,756 | B1* | 6/2014 | Zhang | H04B 1/109 455/114.2 |
| 9,407,298 | B1* | 8/2016 | Hwang | H04B 1/163 |
| 2009/0190633 | A1* | 7/2009 | Smith | H04B 1/123 375/148 |
| 2010/0227570 | A1* | 9/2010 | Hendin | H04B 1/406 455/78 |
| 2011/0212696 | A1* | 9/2011 | Hahn | H04B 1/525 455/83 |
| 2014/0086162 | A1* | 3/2014 | Rimini | H04L 25/03305 370/329 |

(Continued)

*Primary Examiner* — Lewis G West

(57) ABSTRACT

Systems, methods, and devices reduce interference experienced by wireless communications devices. Methods include receiving a first signal from a first transceiver, the first signal being compatible with a first communications protocol, and configuring a filter based, at least in part, on the received first signal, the filter being communicatively coupled to a second transceiver collocated in a same wireless communications device as the first transceiver. The methods further include receiving a second signal, the second signal being compatible with a second communications protocol, and filtering the second signal to remove at least some components of the first signal from the second signal, the filtering reducing at least some interference from the first signal with the second signal. The methods also include providing the filtered second signal to the second transceiver.

20 Claims, 8 Drawing Sheets

(56) References Cited

U.S. PATENT DOCUMENTS

| | | | |
|---|---|---|---|
| 2014/0099893 A1* | 4/2014 | Kheirkhahi | H04J 11/0023 455/41.2 |
| 2014/0269650 A1* | 9/2014 | Sahota | H04B 1/006 370/338 |
| 2016/0211882 A1* | 7/2016 | Hwang | H04B 1/126 |
| 2017/0134059 A1* | 5/2017 | Eskridge, Jr. | H04W 64/006 |
| 2017/0373764 A1* | 12/2017 | Wang | H04L 25/0202 |
| 2019/0013923 A1* | 1/2019 | Liu | H04B 1/525 |
| 2019/0019488 A1* | 1/2019 | Lu | G10K 11/16 |
| 2019/0222350 A1* | 7/2019 | Maeda | G08G 1/09 |
| 2020/0402513 A1* | 12/2020 | Zhu | H04L 69/04 |

* cited by examiner

INTERFERENCE REDUCTION FOR WIRELESS COMMUNICATIONS DEVICES

TECHNICAL FIELD

This disclosure generally relates to wireless communications devices, and more specifically, to reducing interference associated with wireless communications devices.

BACKGROUND

Wireless communications devices may communicate with each other via one or more communications modalities, such as a WiFi connection. Accordingly, such wireless communication may be implemented in a manner compliant with a wireless communication protocol. Moreover, such wireless communications devices may include various hardware components to facilitate such communication. For example, wireless communications devices may include transmission media that may include one or more antennas. Conventional techniques for implementing a coexistence between multiple communications modalities and associated radios remain limited because they are not able to efficiently and effectively reduce interference between modalities.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Wireless communications devices may be implemented in a variety of contexts and environments. For example, wireless communications devices may be implemented in computing devices, mobile devices, and other computing environments. In one example, wireless communications devices may be implemented in vehicles to provide communication between components of the vehicle, such as an on-board computer, and other computing devices, such as a mobile device, a cellular network, or another communications network. In another example, wireless communications devices may be implemented in various Internet of Things (IoT) devices. The wireless communications devices may include transceivers that handle transmit and receive operations in accordance with wireless communications protocols. The transceivers may be coupled to antennas which may facilitate transmission and reception of data over a transmission medium. During operation, transmission from one transceiver may cause interference with signals received by another transceiver, especially when the transceivers are collocated and their operation is asynchronous.

Embodiments disclosed herein provide methods, devices, and systems for reducing interference between collocated transceivers of a wireless communications device. As will be discussed in greater detail below, various wireless communications devices may include filters that are coupled to transceivers and are configured to identify and reduce interference generated by other collocated transceivers. In one example, a signal received at a receive antenna of a collocated transceiver may be used to train a filter, and the filter may be used to remove components of that signal to reduce interference experienced by that transceiver. In another example, data paths between transmit paths and receive paths may be used to configure filters in multiple locations of such paths which may then be used to reduce different components of interference in those receive paths. Accordingly, embodiments disclosed herein enable the improvement and enhancement of operation of such collocated transceivers by reducing interference experienced by transceivers operating in such close proximity.

Figure 1:
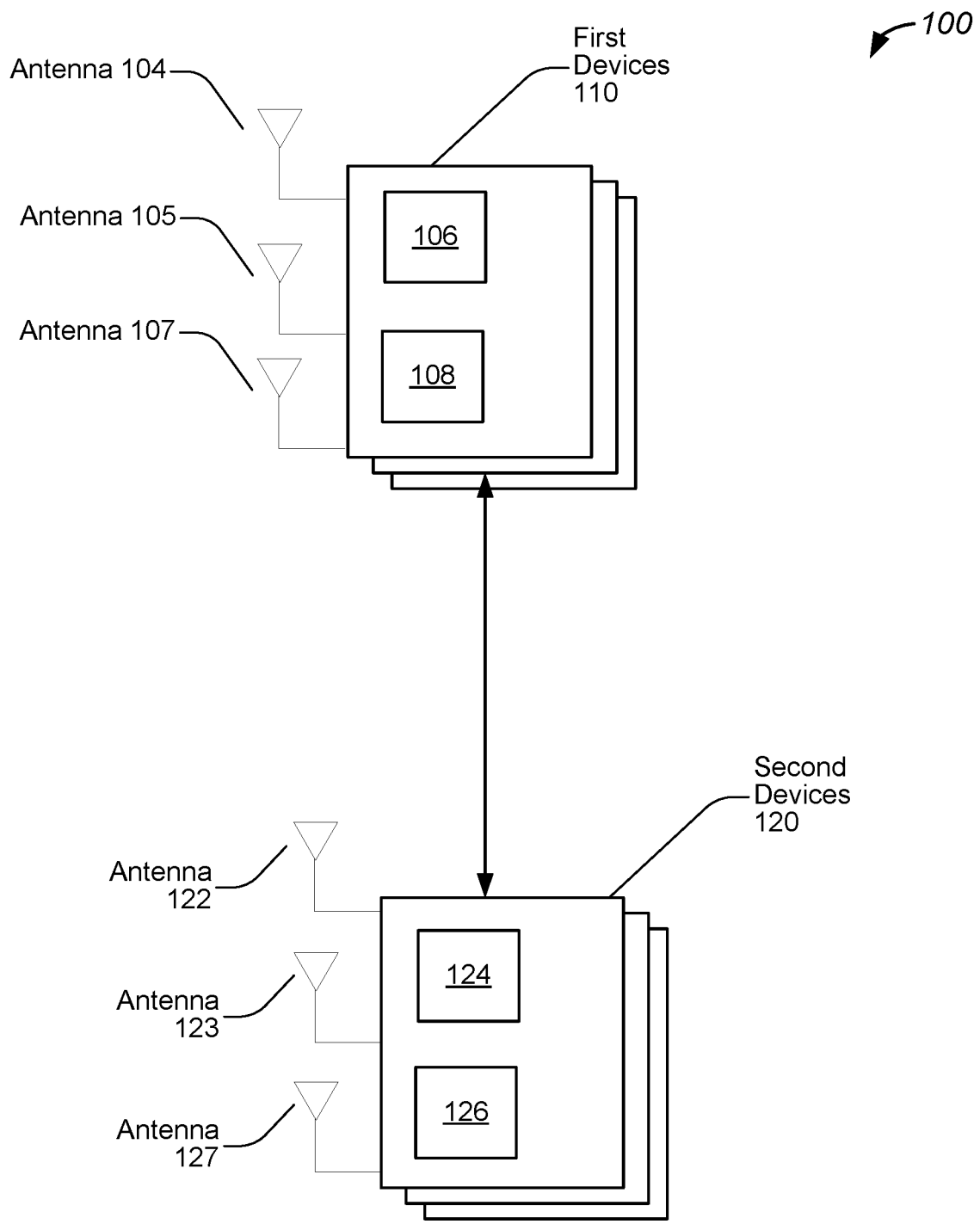
FIG. 1 illustrates a diagram of an example of a system for interference reduction, configured in accordance with some embodiments.

FIG. 1 illustrates a diagram of an example of a system for interference reduction, configured in accordance with some embodiments. As discussed above, various wireless communications devices may communicate with each other via one or more wireless communications media. For example, wireless communications devices may communicate with each other via a WiFi connection or a Bluetooth connection. In various embodiments, the wireless communications devices may first establish connections or communications links before data transfer occurs. As will be discussed in greater detail below, wireless communications devices disclosed herein and systems, such as system 100, that implement such wireless communications devices are configured to reduce interference between collocated radios and associated components, such as transceivers. Accordingly, embodiments disclosed herein enable the improvement and enhancement of operation of such collocated transceivers.

In various embodiments, system 100 may include first devices 110 which may be wireless communications devices. As discussed above, such wireless communications devices may be compatible with one or more wireless transmission protocols, such as a WiFi protocol, a Bluetooth protocol, or any other protocol, such as a Zigbee protocol. Accordingly, first devices 110 may include transceivers and associated hardware to implement communications protocols compatible with Bluetooth as well as wireless local area network (WLAN). In some embodiments, first devices 110 are low energy Bluetooth devices that are compatible with a Bluetooth Low Energy specification and protocol, also referred to as Bluetooth Smart. Moreover, such wireless communications devices may be smart devices, such as those found in wearable devices, or may be monitoring devices, such as those found in smart buildings, environmental monitoring, and energy management. In some embodiments, such devices may be monitoring devices found in automobiles or other vehicles. Accordingly, wireless communications devices disclosed herein may be any suitable device, such as those found in cars, other vehicles, and even medical implants.

As shown in FIG. 1, various wireless communications devices may be in communication with each other via one or more wireless communications mediums. As shown in FIG. 1, first devices 110 may each include one or more antennas, such as antenna 104, antenna 105, and antenna 107. First devices 110 may also include first transceiver 106 as well as second transceiver 108. As will be discussed in greater detail below, processing devices, transceivers, and radios may be configured to establish communications connections with other devices, and transmit data in the form of data packets via such communications connections.

As will be discussed in greater detail below, different components of first devices 110, such as the transceivers, are configured to reduce interference that may occur between different transceivers that are collocated in the same wireless communications device. For example, first transceiver 106 and second transceiver 108 may be collocated within one of first devices 110. In some embodiments, the operation of first transceiver 106 and second transceiver 108 utilize a same transmission medium or band, and are asynchronous such that first transceiver 106 is transmitting data via antenna 104 while second transceiver 108 is receiving data via antenna 107. Accordingly, second transceiver may experience interference due to the transmission of data from antenna 104. As will be discussed in greater detail below, one or more components of second transceiver 108 are configured to reduce signal interference by specifically filtering the received signal to remove one or more components of signal transmissions from first transceiver 106 via antenna 104. In this way, signal interference may be reduced within first devices 110, and asynchronous operation of multiple transceivers within first devices 110 is improved.

In some embodiments, system 100 further includes second devices 120 which may also be wireless communications devices. As similarly discussed above, second devices 120 may be compatible with one or more wireless transmission protocols, such as a WiFi protocol or a Bluetooth protocol. Moreover, second devices 120 may also be smart devices or other devices, such as those found in cars, other vehicles, and medical implants. In various embodiments, second devices 120 may be different types of devices than first devices 110. As discussed above, each of second devices 120 may include one or more antennas, such as antenna 122, antenna 123, antenna 127, as well as third transceiver 126 and fourth transceiver 124, which may also be configured to establish communications connections with other devices, and transmit data in the form of data packets via such communications connections. As discussed above, second devices 120 may also be configured to reduce interference that may occur between the different transceivers, thus enhancing communications between collocated transceivers included in first devices 110 and second devices 120.

Figure 2:
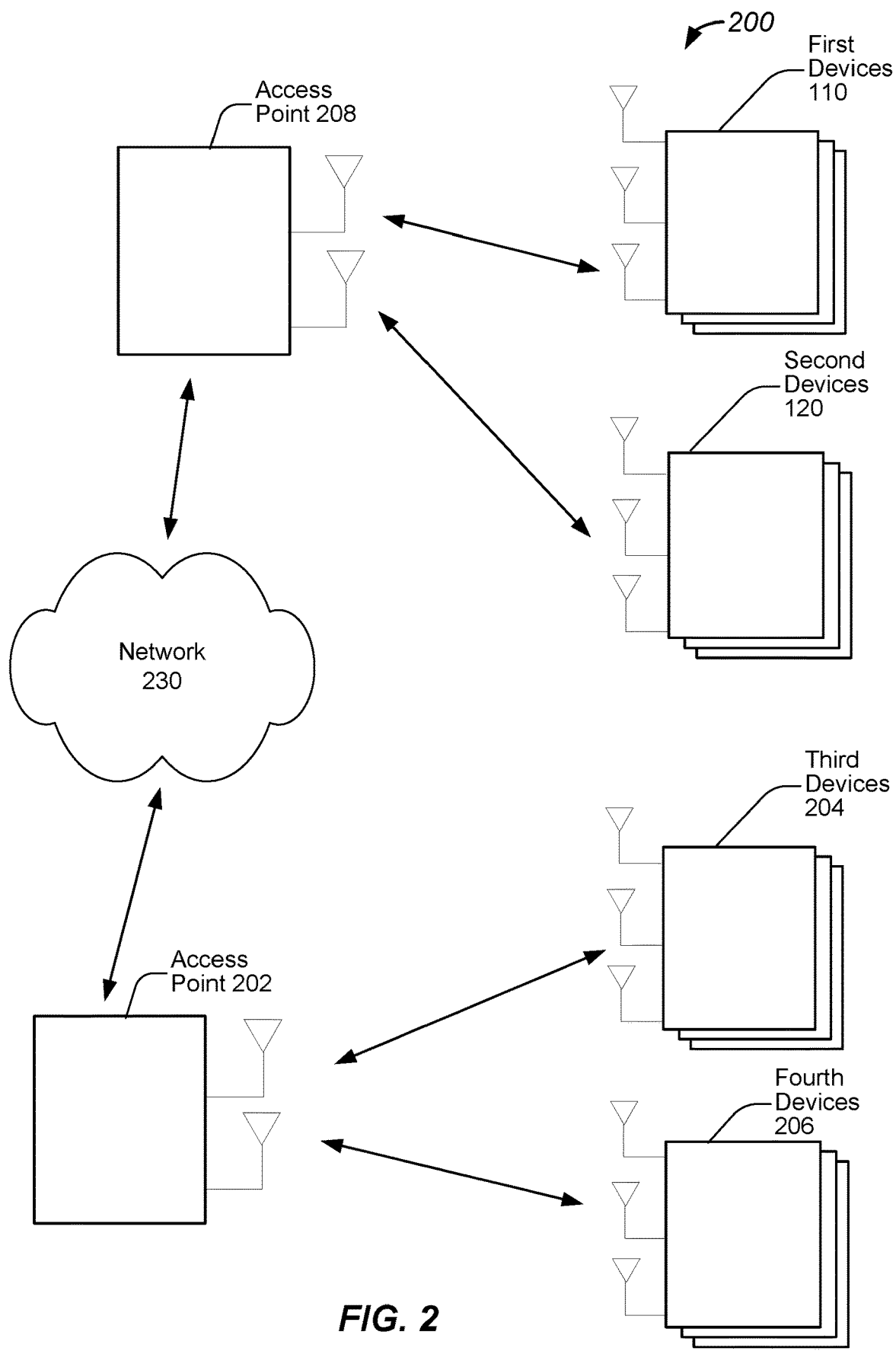
FIG. 2 illustrates a diagram of an example of another system for interference reduction, configured in accordance with some embodiments.

FIG. 2 illustrates a diagram of an example of another system for interference reduction, configured in accordance with some embodiments. In various embodiments, system 200 may include first devices 110 and second devices 120. System 200 further includes various access points, such as access point 208 that is configured to manage communication between first devices 110 and second devices 120, and a communications network, such as network 230. Accordingly, many wireless communications devices may be in communication with each other over a widely implemented communications network, such as the internet.

In various embodiments, system 200 further includes access point 202, third devices 204, and fourth devices 206. As similarly discussed above, access point 202 may be configured to manage communication between third devices 204 and fourth devices 206, and a communications network, such as network 230. Accordingly, as shown in FIG. 2, system 200 may include multiple access points that are coupled with multiple different groups of devices. In this way, various devices may communicate with each other via network 230, and such communication may be managed and scheduled by access points, such as access point 202 and access point 208. As shown in FIG. 2, first devices 110, second devices 120, third devices 204, and fourth devices 206 may each have multiple antennas associated with multiple collocated transceivers that are configured to reduce interference as described in greater detail below.

Figure 3:
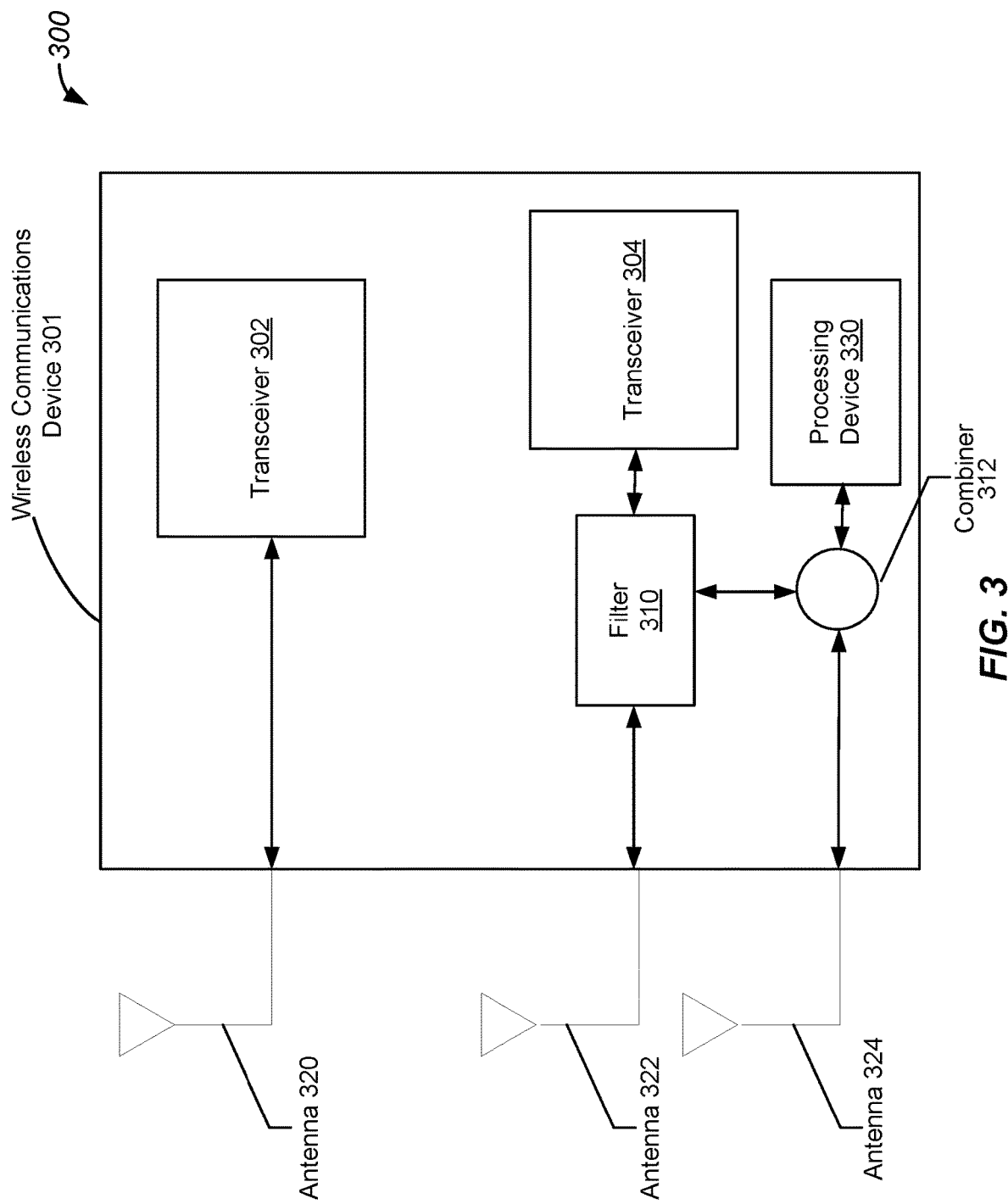
FIG. 3 illustrates a diagram of an example of yet another system for interference reduction, configured in accordance with some embodiments.

FIG. 3 illustrates a diagram of an example of a system for interference reduction, configured in accordance with some embodiments. As discussed above, wireless communications devices disclosed herein may be configured to reduce interference between two or more collocated transceivers. As shown in FIG. 3, a wireless communications device, such as wireless communications device 301, may include collocated transceivers such as transceiver 302 and transceiver 304. Moreover, such transceivers may be coupled to multiple antennas, such as antenna 320, antenna 322, and antenna 324. As discussed above, transceiver 302 and transceiver 304 may each be configured to implement different communications protocols. For example, transceiver 302 may be configured in accordance with a Bluetooth protocol, and transceiver 304 may be configured in accordance with a WiFi protocol.

In various embodiments, wireless communications device 301 includes one or more components that are configured to reduce interference that may be caused by concurrent operation of both transceiver 302 and transceiver 304. More specifically, wireless communications device 301 additionally includes filter 310 and combiner 312. As shown in FIG. 3, transceiver 304 is coupled to both antenna 322 and antenna 324 via filter 310 and combiner 312. In various embodiments, filter 310 is an adaptive filter that is configured to be adjusted based on a signal received via antenna 322. Accordingly, filter 310 has a configurable transfer function that may be configured by one or more other components, such as a processing device discussed in greater detail below with reference to FIG. 5.

In various embodiments, filter 310 is adjusted to cancel interference generated by transceiver 302 via antenna 320. As will be discussed in greater detail below with reference to FIGS. 6 and 7, transceiver 302 may generate and transmit a signal via antenna 320 when transmitting data. The signal may be received at antenna 322 and antenna 324. The signal may be provided to filter 310 from antenna 322, and may also be provided to combiner 312 via antenna 324. Moreover, filter 310 may provide an output to combiner 312 as well. The output of combiner 312 may be provided to a processing device, such as processing device 330, that is used adjust filter 310 to cancel the interference generated by transceiver 302. More specifically, processing device 330 is configured to adjust filter 310 until an output of combiner 312 is reduced or is zeroed. As shown in FIG. 3, combiner 312 is configured to combine an output of filter 310 as well as the output of transceiver 302 as received via antenna 324.

Accordingly, when an output of combiner 312 is zero, the output of filter 310 is effectively canceling the signal generated by transceiver 302 and received via antenna 324. Thus, by virtue of the combining, a comparison between the signals may be implemented, and that comparison is used to adjust the filter. In one example, processing device 330 may implement a progression of several settings, and may identify and select the setting that resulted in an output of zero, or closest to zero. Settings associated with the filter may also be stored in a memory device, as discussed in greater detail below with reference to FIG. 5. Once the configuration of the filter has been completed, transceiver 304 may receive signals via antenna 322 which are filtered by filter 310. In this way, signals subsequently received by transceiver 304 are filtered to remove components of signals generated by transceiver 302.

In various embodiments, the configuration of filter 310 may be implemented during a silent period of operation of transceiver 304. Accordingly, transceiver 304 may be silent or asleep, and the calibration operations implemented by processing device 330 may be implemented between periods of activity of transceiver 304. In this way, filter 310 may be configured and updated periodically and dynamically to maintain effectiveness of the signal filtering and interference reduction provided by filter 310. Moreover, it will be appreciated that filter 310 may be implemented in any number of ways, such as within a digital baseband, an analog baseband, or a digital frequency domain baseband.

Figure 4:
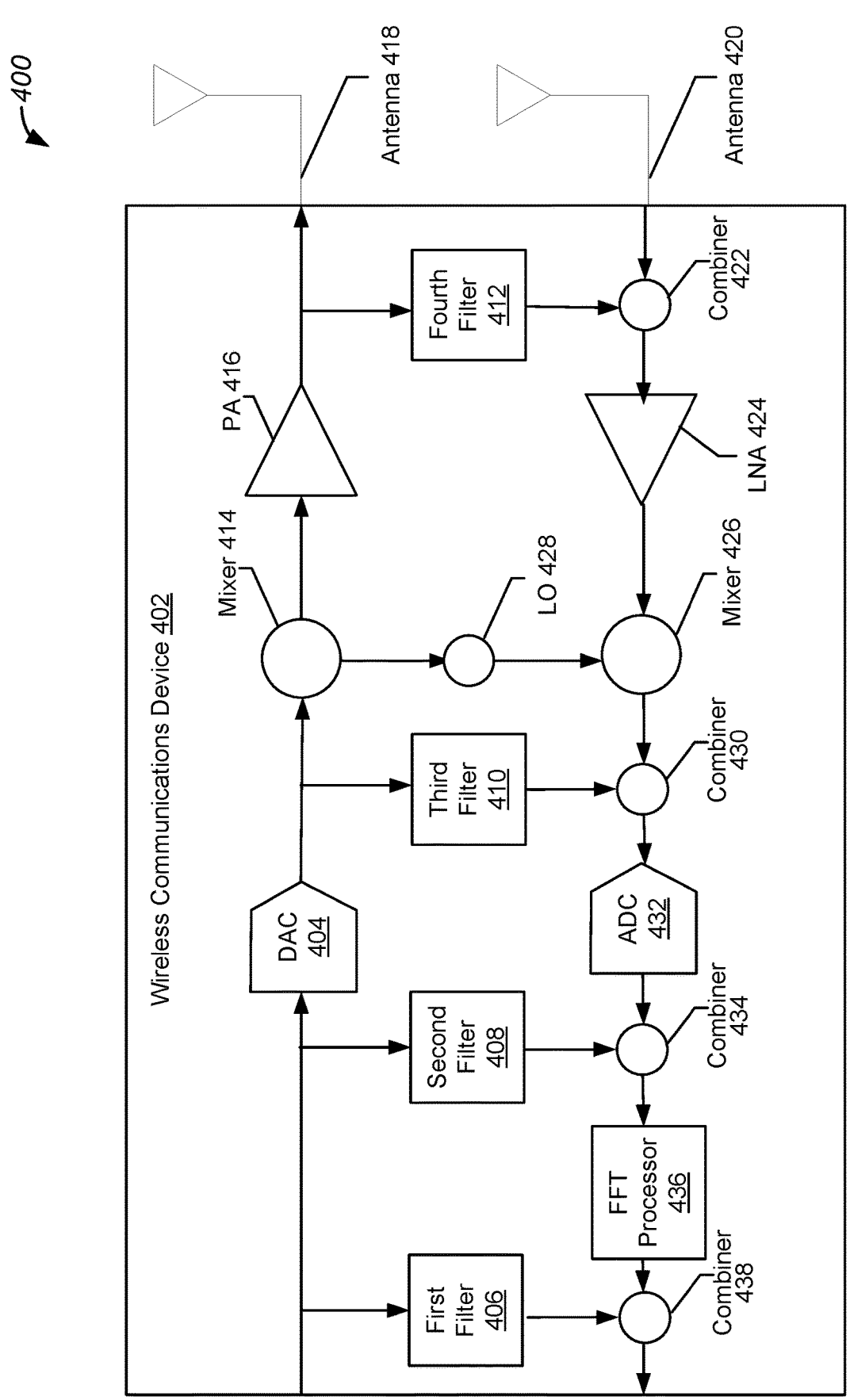
FIG. 4 illustrates a diagram of an example of a device interference reduction, configured in accordance with some embodiments.

FIG. 4 illustrates a diagram of an example of a device interference reduction, configured in accordance with some embodiments. FIG. 4 illustrates a transmit path and a receive path of a device, such as wireless communications device 402. More specifically, a transmit path of a first transceiver may be coupled to a receive path of a second transceiver at several tap off points that are used to filter out interference at multiple points along the receive path. As will be discussed in greater detail below, the different tap off points are specific to different domains and basebands such that associated filters may be specifically configured to target and cancel particular components of the transmitted signal. Moreover, because such configuration of filters is implemented using internal communications paths and internally shared data, the use of antennas, such as antennas 418 and 420, is not required.

As noted above, wireless communications device 402 includes a transmit path that is used by a first transceiver to transmit data. The transmit path includes digital to analog converter 404, mixer 414, and power amplifier 416. Wireless communications device 402 further includes a receive path that is used by a second transceiver to receive data. The receive path includes, among other components, low noise amplifier 424, mixer 426, analog to digital converter 432, and fast Fourier transform (FFT) processor 436. In some embodiments, wireless communications device 402 also includes local oscillator 428 coupled to mixer 414 and mixer 426. Additional components, such as modulators and demodulators, are not shown for clarity.

As discussed above, wireless communications device 402 additionally includes various filters, such as first filter 406, second filter 408, third filter 410, and fourth filter 412. Such filters are configured to receive a sampled input from the transmit path, and are further configured to provide an output to combiners included in the receive path, such as combiner 438, combiner 434, combiner 430, and combiner 422. In various embodiments, first filter 406 is coupled from the transmit path to combiner 438 in a digital frequency domain. In some embodiments, second filter 408 is coupled from the transmit path to combiner 434 in a digital time domain. In various embodiments, third filter 410 is coupled from the transmit path to combiner 430 in an analog baseband. In various embodiments, fourth filter 412 is coupled from the transmit path to combiner 422 in a radio frequency domain.

In various embodiments, the filters may be configured as similarly discussed above with reference to FIG. 3. For example, a signal may be provided via the transmit path, and a filter, such as filter 408, may be configured such that an output of an associated combiner, such as combiner 438, is zeroed or reduced. In this way, each of first filter 406, second filter 408, third filter 410, and fourth filter 412 are configured to cancel interference at different stages of wireless communications device 402.

In various embodiments, a signal received at an input of antenna 420 when antenna 418 is transmitting can be approximated using equation 1 shown below:

$$y(n) = c_1 x(n) + c_2 x'(n) \qquad (1)$$

In equation 1, $x'(n)$ is the differential of the transmitted signal $x(n)$ from antenna 418. The signal $y(n)$ needs to be cancelled on the receive path associated with antenna 420. As discussed above, this cancellation is implemented using first, second, third, and fourth filters. In various embodiments, not all four filters are implemented. For example, fourth filter 412 can be implemented in an RF domain to cancel the $c_1$ component and the second filter 408 can be implemented in a digital domain to cancel the $c_2$ component. In various embodiments, if complete cancellation cannot be accomplished in the RF domain, then partial cancellation of the $c_1$ component can be done in the RF domain using fourth filter 412, and second filter 408 for cancellation of the residual component.

In one example, where complete cancellation of the $c_1$ component in the RF domain is possible, second filter 408 may be used to model the differential term, and be configured as a jw or finite impulse response (FIR) filter in the digital domain. An example of such an FIR filter may be one implemented with taps [−1 0 1] with a large (up to 10×) oversampling over a frequency range of interest. In various embodiments, the oversampling parameters may be determined and configured based on desired performance characteristics. For example, less oversampling may be utilized if reduced performance is acceptable.

In some embodiments, second filter 408 may be implemented in a frequency domain. Accordingly, first filter 406 may be used to cancel the $c_2$ component. Furthermore, third filter 410 may be used to cancel the $c_1$ component to improve cancellation at the analog input of ADC 432. In some embodiments, RF/Analog cancellation may be implemented to avoid saturation at the analog input of ADC 432.

In various embodiments, both the $c_1$ and $c_2$ components are cancelled in the analog domain. However, in some embodiments, complexity of the implementation may be reduced where cancellation of the $c_1$ and $c_2$ components is split between first filter 406 and fourth filter 412 as discussed above.

As will be discussed in greater detail below with respect to FIG. 8, the filters may be individually coupled and decoupled such that configuration of each filter may be implemented independently. For example, first filter 406, second filter 408, third filter 410, and fourth filter 412 may be sequentially decoupled and coupled to calibrate and configure the entire set of filters. More specifically, in an example where component $c_1$ is cancelled by fourth filter 412 and third filter 410, and component $c_2$ is cancelled by second filter 408 and first filter 406, calibration and configuration of the filters may be implemented by first setting antenna 418 to a transmit mode and setting antenna 420 to a receive mode before calibration. Once antenna 420 has been set in transmit mode, fourth filter 412 (implemented in the RF domain) is calibrated to minimize the interference at the output of fourth filter 412. Next, third filter 410 (implemented in the RF domain) is calibrated to cancel the residual $c_1$ component. Then, second filter 408 (implemented in the digital domain) is configured to cancel the $c_2$ component. Finally, first filter 406 may then be configured to cancel the residual $c_2$ component.

Figure 5:
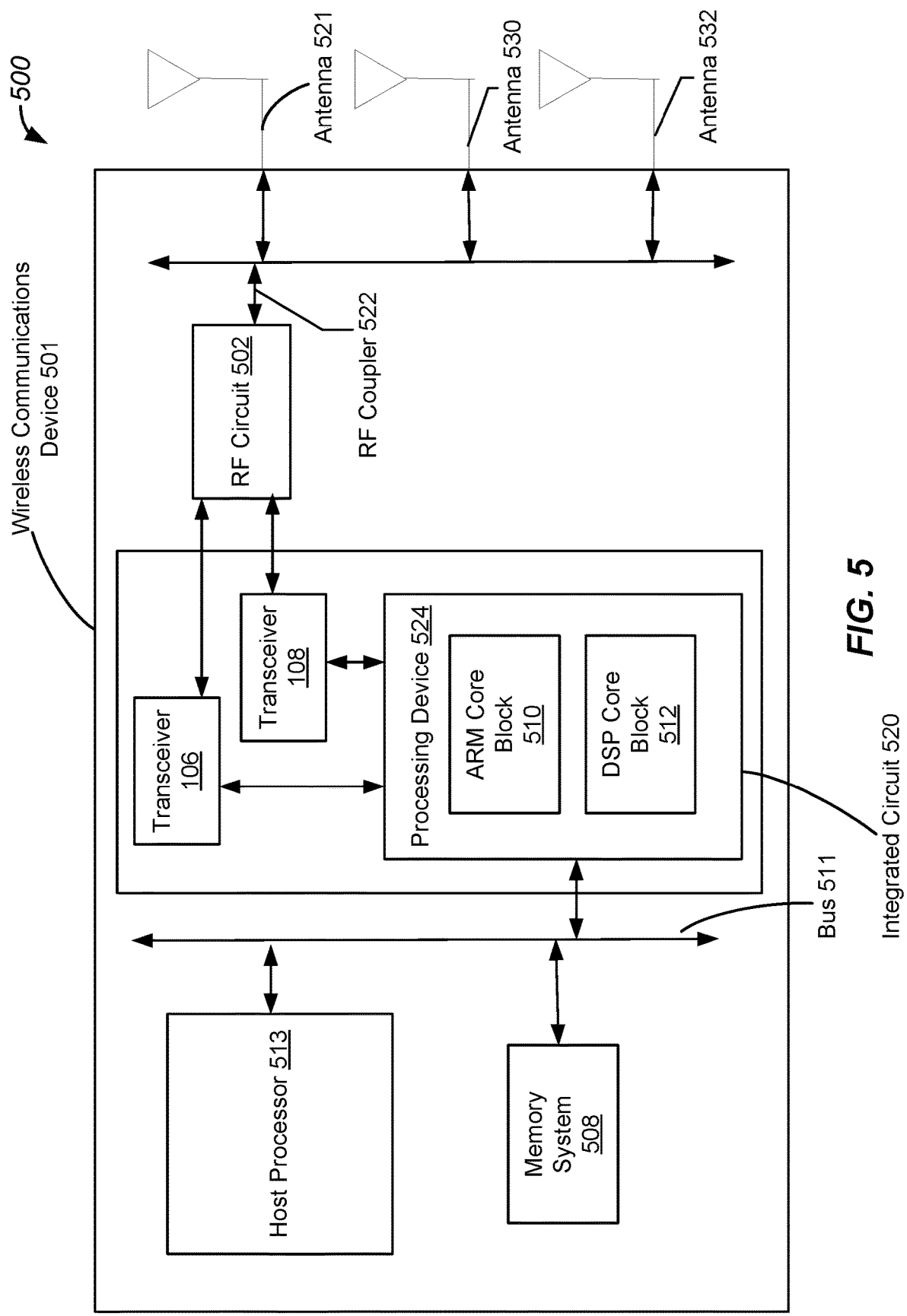
FIG. 5 illustrates a diagram of an example of an additional system for interference reduction, configured in accordance with some embodiments.

FIG. 5 illustrates a diagram of an example of an additional system for interference reduction, configured in accordance with some embodiments. More specifically, FIG. 5 illustrates an example of a system, such as system 500, that may include wireless communications device 501. In various embodiments, wireless communications device 501 includes first transceiver 106 and second transceiver 108, as similarly discussed above. In one example, first transceiver 106 is configured to transmit and receive signals using a communications medium that may include antenna 521. Moreover, second transceiver 108 is configured to transmit and receive signals using a communications medium that may include antenna 532.

As noted above, transceiver 106 may be included in a Bluetooth radio, and may be compatible with a Bluetooth communications protocol. More specifically, transceiver 106 may be compatible with Bluetooth Low Energy protocol. Accordingly, transceiver 106 may include components, such as a modulator and demodulator as well as one or more buffers and filters, that are configured to generate and receive signals via an antenna, such as antenna 521. Moreover, transceiver 108 may be included in a WiFi radio, and may be compatible with a WiFi communications protocol. More specifically, transceiver 108 may be compatible with an 802.11ax protocol. Accordingly, transceiver 108 may include components, such as a modulator and demodulator as well as one or more buffers and filters, that are configured to generate and receive signals via an antenna, such as antenna 532, in accordance with a WiFi protocol.

In various embodiments, system 500 further includes processing device 524 which may include one or more processor cores. In various embodiments, processing device 524 includes one or more processing devices that are configured to configure filters in accordance with the interference reduction techniques disclosed herein. In various embodiments, processing device 524 includes one or more components configured to implement a medium access control (MAC) layer that is configured to control hardware associated with a wireless transmission medium, such as that associated with a Bluetooth and/or WiFi transmission medium. In one example, processing device 524 may include advanced reduced instruction set computing machine (ARM) core block 510 that may be configured to implement a driver, such as a Bluetooth or WiFi driver. Processing device 524 may further include digital signal processor (DSP) core block 512 which may be configured to include microcode.

System 500 further includes radio frequency (RF) circuit 502 which is coupled to antenna 521, antenna 530, and antenna 532. In various embodiments, RF circuit 502 may include various components such as an RF switch, a diplexer, and a filter. Accordingly, RF circuit 502 is configured to manage communication between the antennas and transceivers. In this way, RF circuit 502 may be configured to select an antenna for transmission/reception, and may be configured to provide coupling between the selected antenna, such as antenna 521, and other components of system 500 via a bus.

System 500 includes memory system 508 which is configured to store one or more data values associated with the configuration of filters discussed in greater detail below. Accordingly, memory system 508 includes storage device, which may be a non-volatile random access memory (NVRAM) configured to store such data values, and may also include a cache that is configured to provide a local cache. In various embodiments, system 500 further includes host processor 513 which is configured to implement processing operations implemented by system 500.

It will be appreciated that one or more of the above-described components may be implemented on a single chip, or on different chips. For example, a transceiver, such as transceiver 106, and processing device 524 may be implemented on the same integrated circuit chip, such as integrated circuit chip 520. In another example, transceivers and processing device 524 may each be implemented on their own chip, and thus may be disposed separately as a multi-chip module or on a common substrate such as a printed circuit board (PCB). It will also be appreciated that components of system 500 may be implemented in the context of a vehicle such as an automobile. Accordingly, some components, such as integrated chip 520, may be implemented in a first location of the automobile, while other components, such as antenna 521, may be implemented in second location of the automobile, and coupling between the two may be implemented via a cable such as RF coupler 522.

Figure 6:
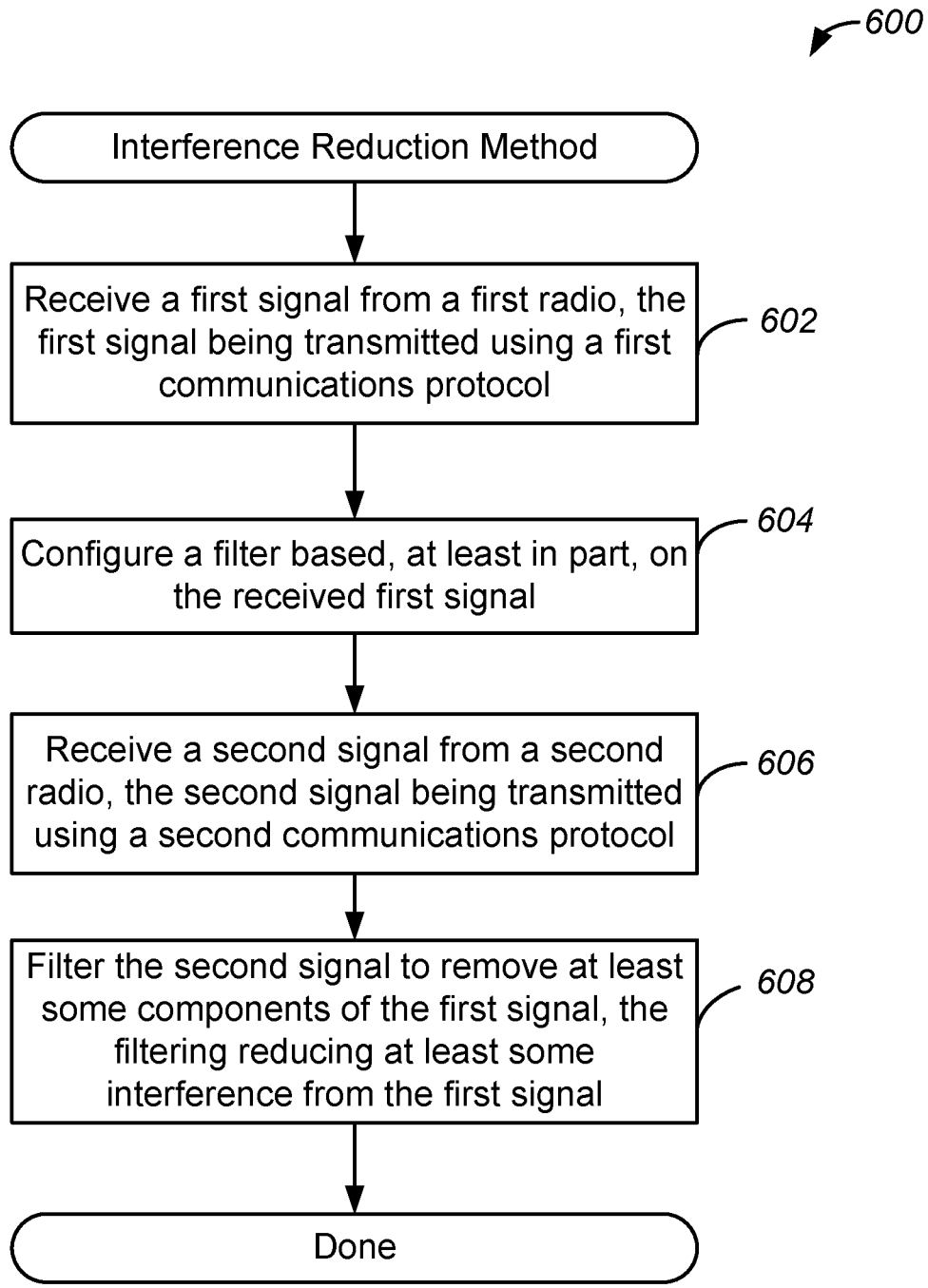
FIG. 6 illustrates a flow chart of an example of a method for interference reduction, implemented in accordance with some embodiments.

FIG. 6 illustrates a flow chart of an example of a method for interference reduction, implemented in accordance with some embodiments. As discussed above, various wireless communications devices may communicate with each other via one or more transceivers. Such transceivers may be collocated in the same wireless communications device, and interference may occur between such transceivers during, for example, asynchronous operation. As will be discussed in greater detail below, such wireless communications devices are configured to implement interference reduction methods, such as method 600, that configure filters to reduce interference between collocated radios and their associated components. In this way, methods disclosed herein enable and enhance the operation of such collocated transceivers.

Method 600 may commence with operation 602 during which a first signal may be received. In various embodiments, the first signal is transmitted from a first transceiver using a first communications protocol. As discussed above, the first communications protocol may be a Bluetooth protocol. The first signal may be transmitted via a transmit path of a first transceiver and via a first antenna coupled to the transmit path.

Method 600 may proceed to operation 604 during which at least one filter may be configured based, at least in part, on the received first signal. As discussed above, the filter may be configured to cancel the transmitted first signal. Such configuring of the filter may be implemented during a calibration operation, and such calibration operation may be implemented during a silent period of a second transceiver.

Method 600 may proceed to operation 606 during which a second signal may be received. In various embodiments, the second signal is transmitted using a second communications protocol. As discussed above, the second communications protocol may be a WiFi protocol. In various embodiments, the second signal may have been transmitted by another wireless communications device, and may be intended for the second transceiver.

Method 600 may proceed to operation 608 during which the second signal is filtered to remove at least some components of the first signal such that the filtering reduces at least some interference from the first signal. Accordingly, during operation 608, the received signal may be provided to the filter, the filter may remove components of the signal as determined based on the configuration that occurred during operation 606, and the filtered output may be provided to the second transceiver. In this way, interference generated by the first transceiver may be removed, at least in part, from the signals received by the second transceiver.

Figure 7:
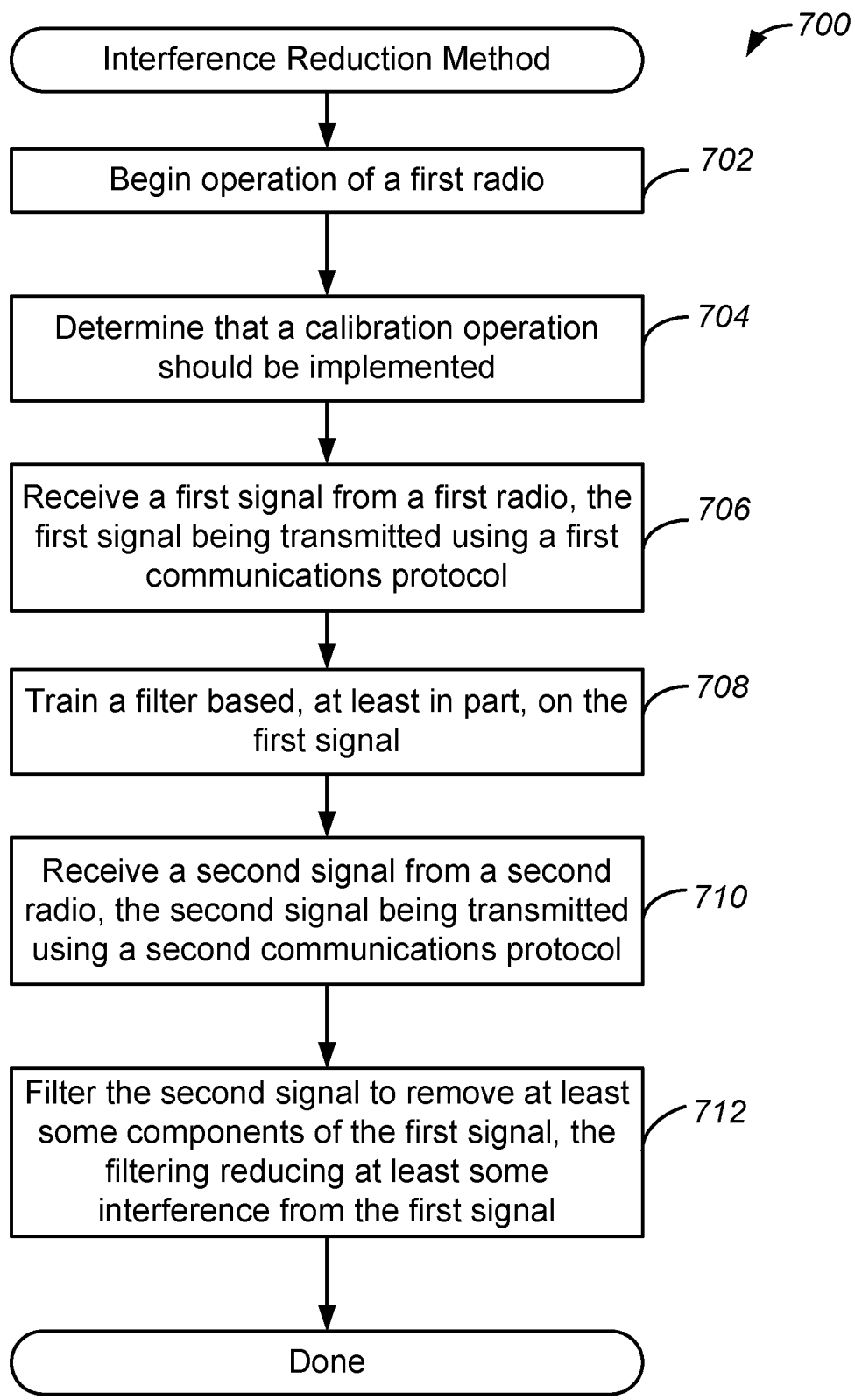
FIG. 7 illustrates a flow chart of another example of a method for interference reduction, implemented in accordance with some embodiments.

FIG. 7 illustrates a flow chart of another example of a method for interference reduction, implemented in accordance with some embodiments. As discussed above, various wireless communications devices are configured to implement interference reduction methods, such as method 700, that configure filters to reduce interference between collocated radios and their associated components. As will be discussed in greater detail below, when multiple receive antennas are available, they may be used to configure a filter to reduce interference.

Method 700 may commence with operation 702 during which operation of a first radio and a first transceiver may begin. As discussed above, the first radio may include a first transceiver and may be configured in accordance with a first communications protocol, such as a Bluetooth protocol. Accordingly, during operation 702, the first radio may begin transmitting data packets to other downstream wireless communications devices.

Method 700 may proceed to operation 704 during which it may be determined that a calibration operation should be implemented. In some embodiments, a component, such as a processing device, may determine that a calibration operation should be implemented for a second radio and a second transceiver included in the second radio. In some embodiments, the determination may be made based on identifying that the first transceiver is transmitting, and the second transceiver is in a silent or sleep period, and is not transmitting or receiving.

Method 700 may proceed to operation 706 during which a first signal may be received from the first radio, the first signal being transmitted using a first communications protocol. As similarly discussed above, the first signal may be transmitted by the first transceiver via a first antenna, and may be received at one or more receive antennas coupled to a collocated second transceiver. Accordingly, during operation 706, the first signal may be received at a receive path of a collocated second transceiver in the same wireless communications device as the first transceiver.

Method 700 may proceed to operation 708 during which a filter may be trained based, at least in part, on the first signal. In various embodiments, the first signal is received at a second antenna coupled to a filter, which is coupled to a combiner, and a third antenna coupled to the combiner. The output of the combiner is provided to a processing device which configures and adjusts the filter until the output of the combiner is reduced and/or zeroed out. Once this has occurred, it is determined that the filter has been trained and is ready for operational use.

Method 700 may proceed to operation 710 during which a second signal is received from another wireless communications device, the second signal being transmitted using a second communications protocol. Accordingly, another wireless communications device may transmit a signal that is received by the second transceiver. As discussed above, the second signal may be sent in accordance with a WiFi communications protocol.

Method 700 may proceed to operation 712 during which the second signal may be filtered to remove at least some components of the first signal. In various embodiments, the filtering reduces at least some interference from the first signal. Accordingly, the second signal may be received at the second antenna, provided to the filter, and an output of the filter may be provided to the second transceiver. In this way, the filter is configured to filter the received signal based on the training and configuration that occurred during operation 708, and the filter removes interference caused by the first transceiver.

Figure 8:
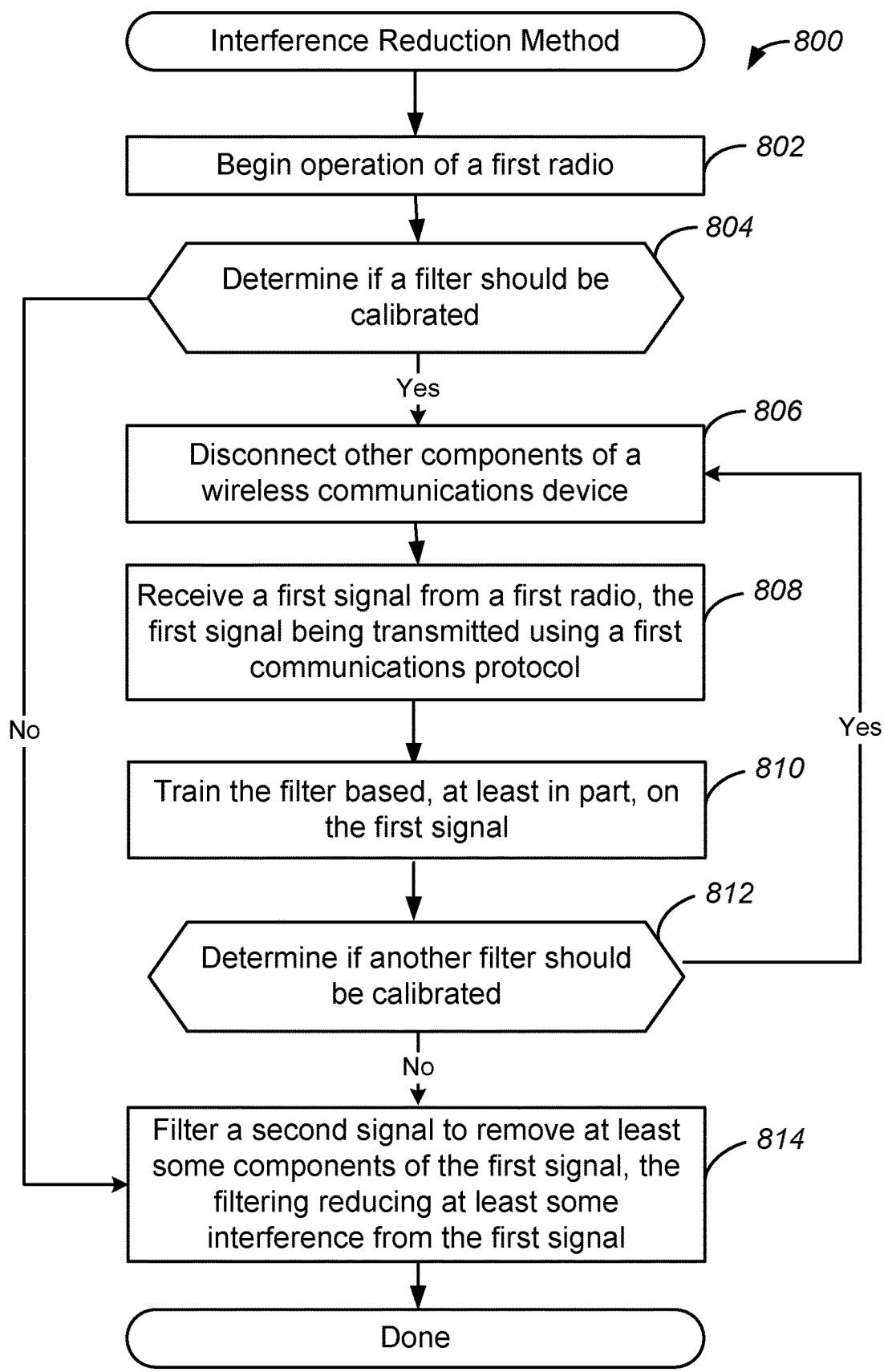
FIG. 8 illustrates a flow chart of yet another example of a method for interference reduction, implemented in accordance with some embodiments.

FIG. 8 illustrates a flow chart of yet another example of a method for interference reduction, implemented in accordance with some embodiments. As discussed above, various wireless communications devices are configured to implement interference reduction methods, such as method 800, that configure filters to reduce interference between collocated radios and their associated components. As will be discussed in greater detail below data may be passed between a transmit path of a first transceiver and a receive path of a second transceiver to facilitate the configuring of filters and implement interference reduction.

Method 800 may commence with operation 802 during which operation of a first radio and a first transceiver may begin. As discussed above, the first radio may include a first transceiver and may be configured in accordance with a first communications protocol, such as a Bluetooth protocol. Accordingly, during operation 802, the first radio may begin transmitting data packets to other downstream wireless communications devices.

Method 800 may proceed to operation 804 during which it may be determined if a calibration operation should be implemented. Such a determination may be made based on a current state of a second transceiver. For example, if the second transceiver is in a silent or sleep state or mode, the calibration operation may be implemented, and method 800 may proceed to operation 806. If the second transceiver is not in a silent or sleep state, the calibration operation may be skipped, and method 800 may proceed to operation 814. In some embodiments, a component, such as a processing device, may make the determination as to whether the calibration operation should be implemented.

If it is determined that a calibration operation should be implemented, method 800 may proceed to operation 806 during which one or more other components of the wireless communications device may be disconnected. As similarly discussed above, a filter to be calibrated may be identified based on a data table or state machine maintained by a processing device and memory device, as discussed above with reference to FIG. 5. Accordingly, during operation 806, a filter to be calibrated may be selected, and the other downstream filters may be disconnected and decoupled from the transmit path and receive path.

Method 800 may proceed to operation 808 during which a first signal may be received from the first transceiver, the first signal being transmitted using a first communications protocol. Accordingly, the first signal may be provided to the transmit path. As discussed above with reference to FIG. 4, the filter being trained has an input that is coupled to the transmit path at a particular location, also referred to herein as a tap off point.

Method 800 may proceed to operation 810 during which the filter may be trained based, at least in part, on the first signal. Accordingly, the processing device may adjust and modify parameters of the filter such that the filter cancels or zeroes out the first signal.

Method 800 may proceed to operation 812 during which it may be determined if another filter should be calibrated. Such a determination may be made based on previously described data table or state machine. For example, the processing device may maintain a list of filters, and may step through each of the filters until the list terminates. If it is determined that another filter should be calibrated, method 800 may return to operation 806. If it is determined that no other filter should be calibrated, method 800 may proceed to operation 814.

Method 800 may proceed to operation 814 during which during which a second signal may be filtered to remove at least some components of the first signal. In various embodiments, the second signal is received from an additional wireless communications device, and is received at the receive path of the second transceiver. Each of the filters may provide an input, also referred to herein as a cancelation signal, to the receive path via one or more combiners at each of several locations corresponding to the tap off locations. Each input reduces or cancels an interference produced by the first signal in the respective domain of each filter. In this way, the second signal may be received at the second antenna, and outputs of the filters may be provided to different locations of the receive path of the second transceiver to remove different components of interferences caused by the transmit path of the first transceiver.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
   receiving a first signal from a first transceiver, the first signal being compatible with a first communications protocol;
   configuring, using a processor, a filter based, at least in part, on the received first signal, the filter being communicatively coupled to a second transceiver collocated in a same wireless communications device as the first transceiver, the configuring of the filter comprising sampling a plurality of locations of a transmit path of the first transceiver and generating at least one cancelation signal based on the sampling;
   receiving a second signal, the second signal being compatible with a second communications protocol;
   filtering, using the filter, the second signal to remove at least some components of the first signal from the second signal, the filtering reducing at least some interference from the first signal with the second signal, the filtering comprising combining the at least one cancelation signal with the second signal; and
   providing the filtered second signal to the second transceiver.

2. The method of claim 1, wherein the configuring of the filter further comprises:
   configuring the filter based, at least in part, on a comparison of the first signal received at a first receive path including the filter and the first signal received at a second receive path.

3. The method of claim 2, wherein the comparison further comprises:
   generating an output signal by combining an output of the first receive path and the second receive path; and
   adjusting the filter until output signal is reduced.

4. The method of claim 2, wherein the filter is a time-domain filter.

5. The method of claim 1, wherein the second signal is received via a receive path of the second transceiver.

6. The method of claim 5, wherein the filtering further comprises:
   combining the at least one cancelation signal with a receive path signal of the second transceiver.

7. The method of claim 6, wherein the configuring of the filter further comprises:
   sampling the transmit path signal of the first transceiver at each of the plurality of locations along the transmit path; and
   generating a cancelation signal for each of the plurality of locations.

8. The method of claim 7, wherein the filtering further comprises:
   combining each of the cancelation signals with the receive path signal at each of a plurality of corresponding locations.

9. The method of claim 1, wherein the first transceiver is a Bluetooth transceiver and the first communications protocol is compatible with a Bluetooth protocol, wherein the second transceiver is a wireless local area network (WLAN) transceiver and the second communications protocol is compatible with a WiFi protocol, and wherein the first transceiver and the second transceiver are collocated in a same wireless communications device.

10. A system comprising:
    a first transceiver configured to generate a first signal compatible with a first communications protocol;
    a second transceiver configured to receive a second signal compatible with a second communications protocol, wherein the first transceiver and the second transceiver are collocated in a same wireless communications device;
    a first antenna configured to transmit the first signal generated by the first transceiver;
    a second antenna configured to receive the first signal from the first transceiver;
    a third antenna configured to receive the first signal from the first transceiver, wherein the first antenna, the second antenna, and the third antenna are collocated in the same wireless communications device;
    a filter coupled to the second antenna and the second transceiver, wherein the filter is configured to filter an input received via the second antenna by combining at least one cancelation signal with the input; and
    a processing device configured to modify the filter based, at least in part, on an output of the filter and the third antenna, wherein the processing device is further configured to modify the filter by sampling a plurality of locations of a transmit path of the first transceiver and generating the at least one cancelation signal based on the sampling.

11. The system of claim 10, wherein the first transceiver is a Bluetooth transceiver and the first communications protocol is compatible with a Bluetooth protocol.

12. The system of claim 11, wherein the second transceiver is a WLAN transceiver and the second communications protocol is compatible with a WiFi protocol.

13. The system of claim 12, wherein the first transceiver and the second transceiver are implemented on the same integrated circuit.

14. The system of claim 10, wherein the filter is included in a digital baseband of the second transceiver.

15. The system of claim 10, wherein the filter is a time-domain filter.

16. A device comprising:
a first transceiver configured to generate a first signal compatible with a first communications protocol;
a second transceiver configured to receive a second signal compatible with a second communications protocol, wherein the first transceiver and the second transceiver are collocated in a same wireless communications device;
a filter coupled between a transmit path of the first transceiver and a receive path of the second transceiver, wherein the filter is configured to receive a sampled input from a transmit path signal, and generate an output that is provided to a receive path signal, and wherein the filter is configured to filter an input received via the second antenna by combining at least one cancelation signal with the input; and
a processing device configured to modify the filter based, at least in part, on the sampled input from the transmit path signal and an output of the filter, wherein the processing device is further configured to modify the filter by sampling a plurality of locations of a transmit path of the first transceiver and generating the at least one cancelation signal based on the sampling.

17. The device of claim 16, wherein the first transceiver is a Bluetooth transceiver and the first communications protocol is compatible with a Bluetooth protocol, wherein the second transceiver is a WLAN transceiver and the second communications protocol is compatible with a WiFi protocol.

18. The device of claim 17, wherein the first transceiver and the second transceiver are implemented on a same integrated circuit.

19. The device of claim 18, wherein the filter is included in a digital baseband of the wireless communications device.

20. The device of claim 18, wherein the filter is included in an analog baseband of the wireless communications device.

\* \* \* \* \*